United States Patent
Kuroyanagi et al.

(10) Patent No.: US 11,980,313 B2
(45) Date of Patent: May 14, 2024

(54) RICE COOKER

(71) Applicant: KOUSOGENMAI LABO INC., Aichi (JP)

(72) Inventors: Mikiya Kuroyanagi, Aichi (JP); Mikako Yoshida, Aichi (JP)

(73) Assignee: KOUSOGENMAI LABO INC., Aichi (JP)

( * ) Notice: Subject to any disclaimer, the term of this patent is extended or adjusted under 35 U.S.C. 154(b) by 959 days.

(21) Appl. No.: 16/942,116

(22) Filed: Jul. 29, 2020

(65) Prior Publication Data

US 2020/0352383 A1    Nov. 12, 2020

Related U.S. Application Data

(63) Continuation of application No. PCT/JP2019/003865, filed on Feb. 4, 2019.

(30) Foreign Application Priority Data

Feb. 5, 2018   (JP) ................................ 2018-018227

(51) Int. Cl.
*A47J 27/04*    (2006.01)
*A47J 27/08*    (2006.01)
(Continued)

(52) U.S. Cl.
CPC ........... *A47J 27/04* (2013.01); *A47J 27/0802* (2013.01); *A47J 27/086* (2013.01);
(Continued)

(58) Field of Classification Search
CPC ...... A47J 27/04; A47J 27/0802; A47J 27/086; A47J 2027/043; A23L 5/13
See application file for complete search history.

(56) References Cited

U.S. PATENT DOCUMENTS

| | | | |
|---|---|---|---|
| 4,431,906 A * | 2/1984 | Oota | G05D 23/24 99/333 |
| 5,275,836 A * | 1/1994 | Lewis | A23L 7/196 426/627 |

(Continued)

FOREIGN PATENT DOCUMENTS

| | | |
|---|---|---|
| JP | S62-49812 A | 3/1987 |
| JP | H5-228050 A | 9/1993 |

(Continued)

OTHER PUBLICATIONS

International Search Report issued in related parent International Patent Application No. PCT/JP2019/003865, dated Apr. 23, 2019, with English translation.

(Continued)

*Primary Examiner* — Reginald Alexander
(74) *Attorney, Agent, or Firm* — Rimon P.C.

(57) ABSTRACT

Provided is a rice cooker suitable for enzyme brown rice. The rice cooker (1) is provided with rice-cooking control details with via which the following steps are executed in the stated order: a softening step in which the temperature detected by a temperature detector (5) is kept in a range of 50 to 70° C. inclusive and contents of the rice cooker (1) are softened; a first heating step in which the temperature detected by the temperature detector (5) is kept in a range of 110 to 130° C. inclusive while the pressure in an inner pot part (2) is kept in a range of 1.8 to 2.2 atmospheres inclusive; a second heating step in which the temperature detected by the temperature detector (5) is raised so as to be higher than that in the first heating step and the temperature is kept in a range of 115 to 155° C. inclusive while the pressure in the inner pot part is kept in a range of 1.8 to 2.2 atmospheres inclusive; and a steaming step in which the contents are steamed for a prescribed period.

2 Claims, 4 Drawing Sheets

(51) Int. Cl.
*A47J 27/086* (2006.01)
*A47J 36/24* (2006.01)
*A47J 36/32* (2006.01)

(52) U.S. Cl.
CPC .......... *A47J 36/2405* (2013.01); *A47J 36/32* (2013.01); *A47J 2027/043* (2013.01)

(56) References Cited

U.S. PATENT DOCUMENTS

| | | | | |
|---|---|---|---|---|
| 5,997,930 A * | 12/1999 | Kendall | ................. | A23L 7/196 426/507 |
| 6,551,649 B1 * | 4/2003 | Minier | ................... | A23L 7/196 426/627 |

FOREIGN PATENT DOCUMENTS

| | | | | |
|---|---|---|---|---|
| JP | 2002-119421 A | 4/2002 | | |
| JP | 2007-209481 A | 8/2007 | | |
| JP | 2014-113266 A | 6/2014 | | |
| WO | WO-2012056174 A2 * | 5/2012 | .............. | A23L 5/13 |
| WO | WO-2012056175 A2 * | 5/2012 | .............. | A23L 5/13 |

OTHER PUBLICATIONS

Japanese Office Action issued in corresponding Japan Patent Application No. 2018-018227, dated Apr. 23, 2018.

* cited by examiner

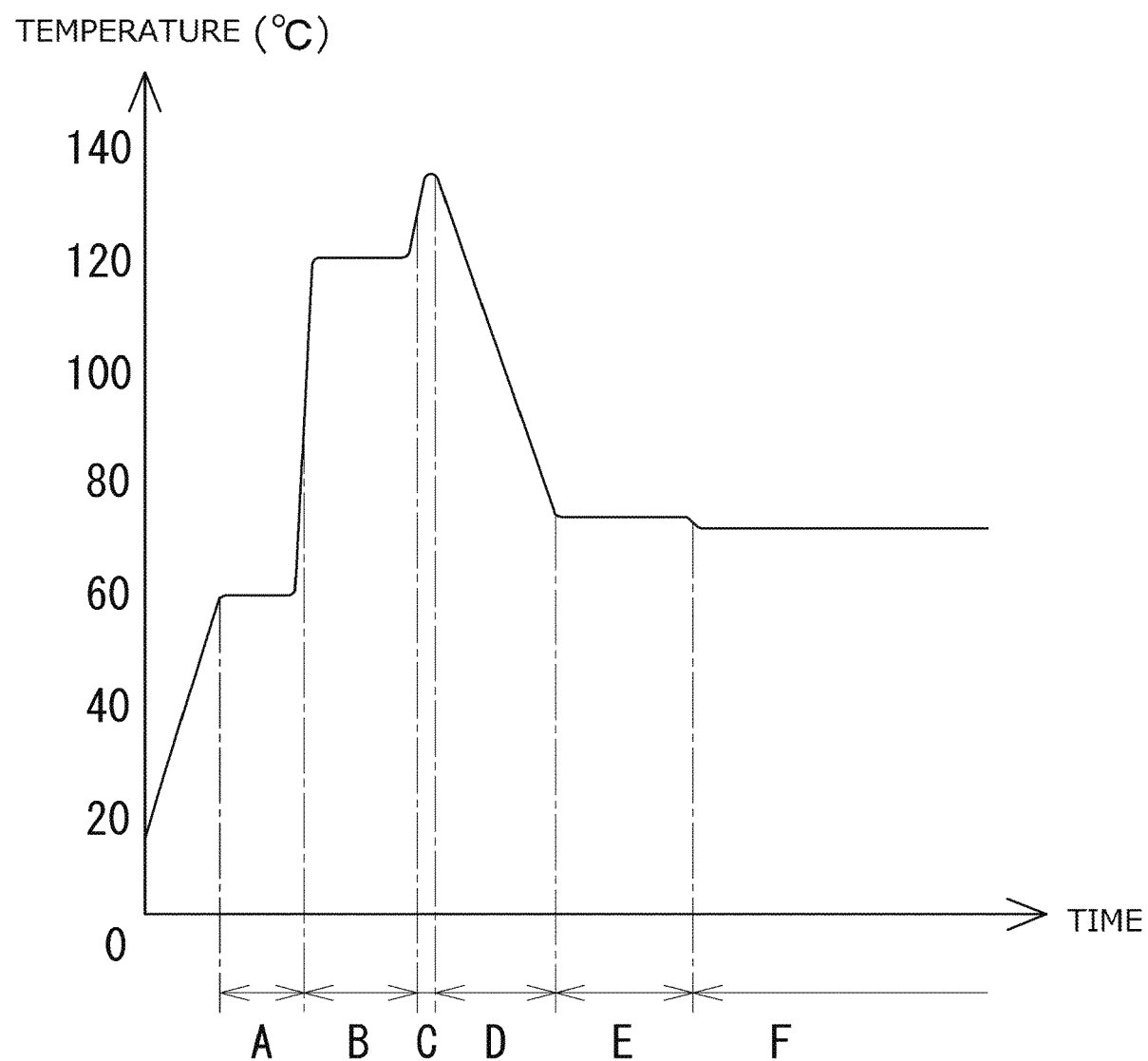

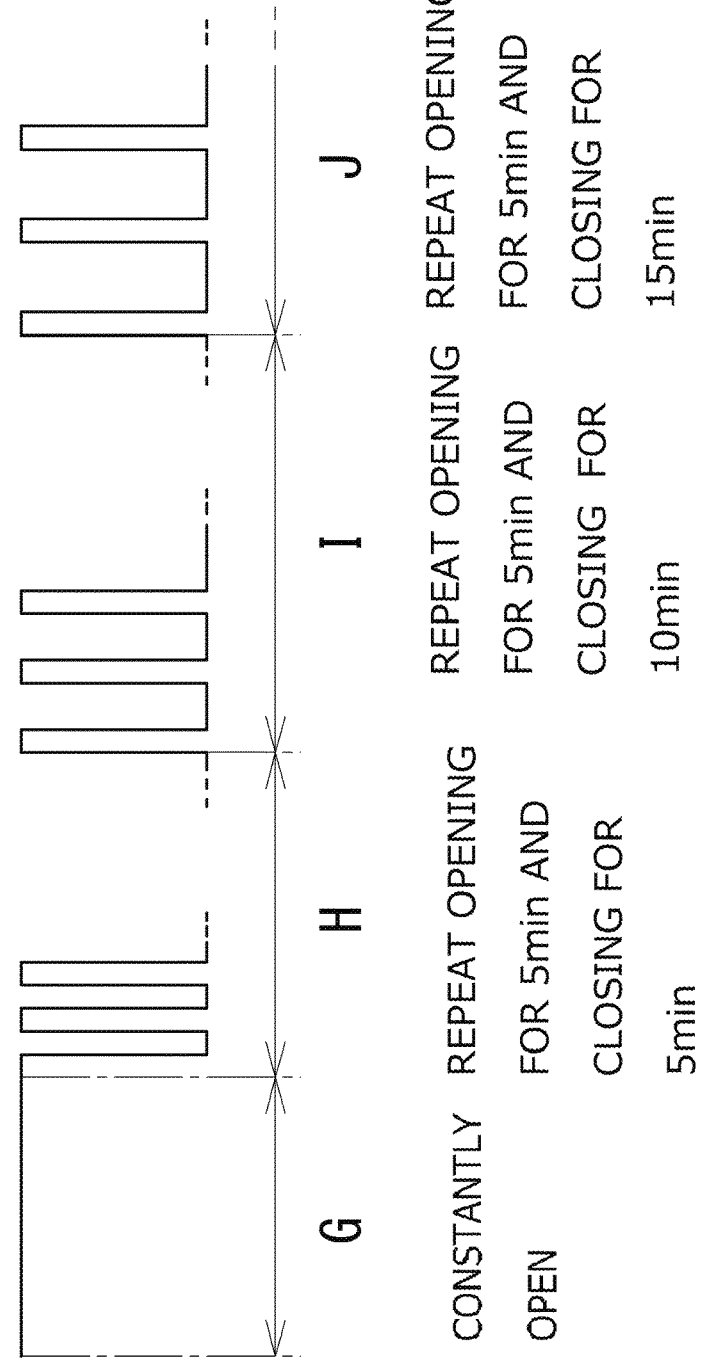

RICE COOKER

RELATED APPLICATION

This application is a Continuation Application of International Application No. PCT/JP2019/3865, filed Feb. 4, 2019, which claims priority to Japan Application No. 2018-018227, filed Feb. 5, 2018. The subject matter of each is incorporated herein by reference in entirety

FIELD OF THE INVENTION

The present invention relates to a rice cooker capable of cooking what is called enzyme brown rice, in which brown rice and adzuki beans are mainly used.

BACKGROUND ART

In recent years, what is called enzyme brown rice (also called fermented brown rice or aged brown rice), which is brown rice and adzuki beans cooked with salt and water, attracts attention as a highly nutritious food.

For example, Patent Document 1 discloses a configuration capable of cooking brown rice or the like even without soaking it in water beforehand as a rice cooker for cooking brown rice or the like.

CITATION LIST

Patent Literature

Patent Literature 1: Japanese Unexamined Patent Application Publication No. 2014-113266

SUMMARY OF THE INVENTION

Problem to be Solved by the Invention

However, because adzuki beans are used in enzyme brown rice, a process of soaking them in water for at least about one hour is required. Also, a problem that arises when a conventional rice cooker is used is that the rice-cooking tune is long and, in addition, the skin of the brown rice or adzuki beans remain hard, making it difficult to eat. Also, another problem is that although enzyme brown rice is a highly nutritious food, it is difficult to digest and the nutrients of brown rice or the like are difficult to absorb properly into the body unless it is cooked soft.

Also, enzyme brown rice is kept in a warm state for about 2 to 4 days after being cooked to promote aging, but the aging does not proceed well unless it is kept warm at an appropriate temperature. Also, when enzyme brown rice is left in an airtight state while it is kept warm, it will get sticky and have poor texture. On the other hand, when enzyme brown rice is kept warm in an open state where outside air can be freely taken in, it will lose moisture excessively and be overdried. Here, again, the problem of deterioration of texture or improper progress of aging occurs.

After all, when a conventional rice cooker is used in order to cook enzyme brown rice tasty, there arises a problem of requiring troublesome work or being unable to bring out the good taste or high nutritional value of enzyme brown rice.

It is, therefore, an object of the present invention to provide a rice cooker suitable for enzyme brown rice.

Means for Solving Problem

The present invention provides a rice cooker, including: an inner pan part for containing enzyme brown rice including at least brown rice and adzuki beans as a content; a heating part for heating the inner pan part; a temperature detection part for detecting a temperature of a bottom part of the inner pan part; an on-off valve part for providing communication or non-communication between inside and outside of the inner pan part; and control means for controlling the heating part and the on-off valve part based on a temperature detected by the temperature detection part, in which the control means includes a rice-cooking control content for executing: a steeping process, executed after a step of receiving a command signal that sequentially executes a rice-cooking procedure to continue to warm the inner pan part at ambient temperature, of maintaining the temperature detected by the temperature detection part within a range of 50° C. or higher and 70° C. or lower to steep the content; a first heating process, executed after the steeping process, of maintaining the temperature detected by the temperature detection part within a range of 110° C. or higher and 130° C. or lower with a pressure in the inner pan part maintained within a range of 1.8 atmospheres or higher and 2.2 atmospheres or lower; a second heating process, executed after the first heating process, of setting the temperature detected by the temperature detection part within a range of 115° C. or higher and 155° C. or lower, which is further higher than that in the first heating process, with a pressure in the inner pan part maintained within a range of 1.8 atmospheres or higher and 2.2 atmosphere or lower; and a steaming process, executed after the second heating process, of steaming the content for a predetermined period of time.

In the above configuration, by maintaining the temperature within the above range in the steeping process, it is possible to allow both the brown rice and adzuki beans to absorb sufficient moisture and to provide an opportunity to properly promote saccharification of both the brown rice and adzuki beans in the following process. In particular, adzuki beans have hard surface and are unlikely to absorb moisture. However, when the temperature of the present invention is employed, a proper water absorbing effect can be obtained and softening of adzuki beans can be promoted.

Also, by maintaining the temperature within the above range in the first heating process, it is possible to soften both the brown rice and adzuki beans properly. It should be noted that, in the present invention, because the pressure in the inner pan part is maintained high by open/close control of the on-off valve part as described above, it is possible to raise the boiling point of water so that the brown rice and adzuki beans can be heated at the above temperature. It should be noted that when the heating causes the temperature to reach a temperature higher than 130° C. in the first heating process, the adzuki beans as a content will be broken and have poor appearance and texture, and the sweetness of the adzuki beans will be also reduced.

In addition, after the first heating process, by increasing the temperature rapidly in the second heating process, it is possible to cook the content within a short period of time.

Then, by providing the control content including the above processes, the time necessary for the steaming process for the enzyme brown rice can be reduced to 30 minutes or shorter, for example. Here, even when the time spent on the steaming process is short, because the steeping process is executed within the above temperature range, softening of the brown rice and adzuki beans is promoted and it is possible to cook enzyme brown rice that is easy to digest and absorb and is flavorous and tasty. Also, because softening of the brown rice and adzuki beans is promoted and a Maillard reaction during the keep-warm period proceeds as actively as in a conventional case, it is possible to obtain enzyme brown rice with a high nutritional value.

Also, a configuration is proposed in which the control means further includes a keep-warm control content for executing: a first keep-warm process, executed after the completion of the steaming process of the rice-cooking control content, of maintaining the temperature detected by the temperature detection part within a range of 72° C. or higher and 76° C. or lower; and a second keep-warm process, executed after the first keep-warm process, of maintaining the temperature detected by the temperature detection part within a range of 70° C. or higher and 74° C. or lower, which is further lower than that in the first keep-warm process.

In the first keep-warm process, because the temperature is set higher than a conventional temperature, it is possible to age the cooked enzyme brown rice early. On the other hand, when a high temperature is maintained, the enzyme brown rice is easily dried. In the present invention, however, the temperature at which the enzyme brown rice in the second warm-keep process is kept warm is lower than the that in the first keep-warm process. Thus, it is possible to prevent the enzyme brown rice from being dried excessively. Also, with the above configuration, it is possible to obtain enzyme brown rice that is tasty even if it is eaten during either of the keep-warm processes. It should be noted that when the temperature is 69° C. or lower in the above keep-warm processes, for example, the enzyme brown rice may tend to be putrescible.

Also, a configuration is proposed in which the control means is configured to execute the keep-warm control content and to include an on-off valve part control content for repeating a step of bringing the on-off valve part into an open state or closed state, and in which the on-off valve part control content includes a step of increasing the time of closed state compared to that of a previously closed state with the lapse of time.

With this configuration, it is possible to maintain the moisture content of the resulting cooked enzyme brown rice in an optimum state. In other words, in a keep-warm stage after the completion of rice cooking, aging of the enzyme brown rice proceeds and excess moisture is generated. Here, when the moisture content is left unadjusted, the enzyme brown rice will have a problem of getting sticky with moisture. On the other hand, the enzyme brown rice will have a problem of getting overdried when an open state is simply maintained. Thus, by increasing the time of closed state gradually with the lapse of time, it is possible to prevent the enzyme brown rice from being overdried and maintain its moisture content in an optimum state. Also, because aging of the enzyme brown rice proceeds properly in parallel, the nutrients of the enzyme brown rice are turned into a state easier to digest and absorb.

Effect of the Invention

The rice cooker of the present invention has an excellent effect f being able to cook enzyme brown rice to a preferred state.

BRIEF DESCRIPTION OF THE DRAWINGS

FIG. 3 is a graph showing changes in temperature that is detected by a temperature detection part associated with a procedure for cooking enzyme brown rice according to the example.

FIG. 4 is a time chart showing open and closed states of an on-off valve part associated with the procedure for keeping the enzyme brown rice warm according to the example.

DETAILED DESCRIPTION OF EMBODIMENTS

In the following, an example embodying a rice cooker of the present invention is described in detail. It should be noted that the present invention is not limited to the example shown below, and can be changed in design as appropriate.

Figure 1:
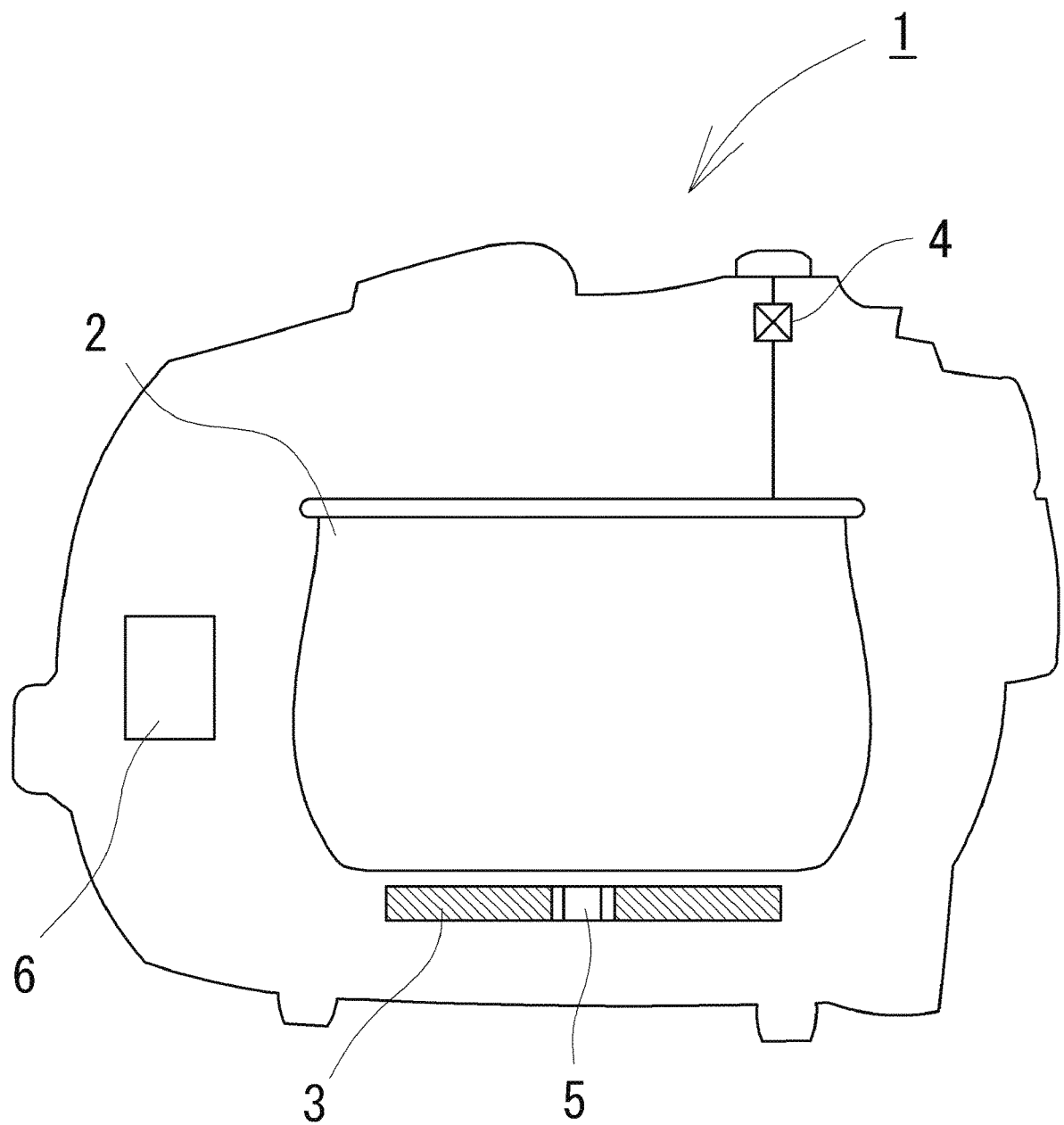
FIG. 1 is a schematic view of a rice cooker according to an example.

As shown in FIG. 1, a rice cooker 1 includes an inner pan part 2 having pressure-resistance, a heating part 3 having a heater for heating the inner pan part 2, an on-off valve part 4 having an on-off valve for providing communication (open state) or non-communication (closed state) between inside and outside of the inner pan part to adjust a pressure or the like in the inner pan part 2, and a temperature detection part 5 for detecting a temperature of a bottom part of the inner pan part 2. Also, the rice cooker 1 is provided with a control part 6 having a central processing unit (CPU) and storage devices (ROM, RAM).

Figure 2:
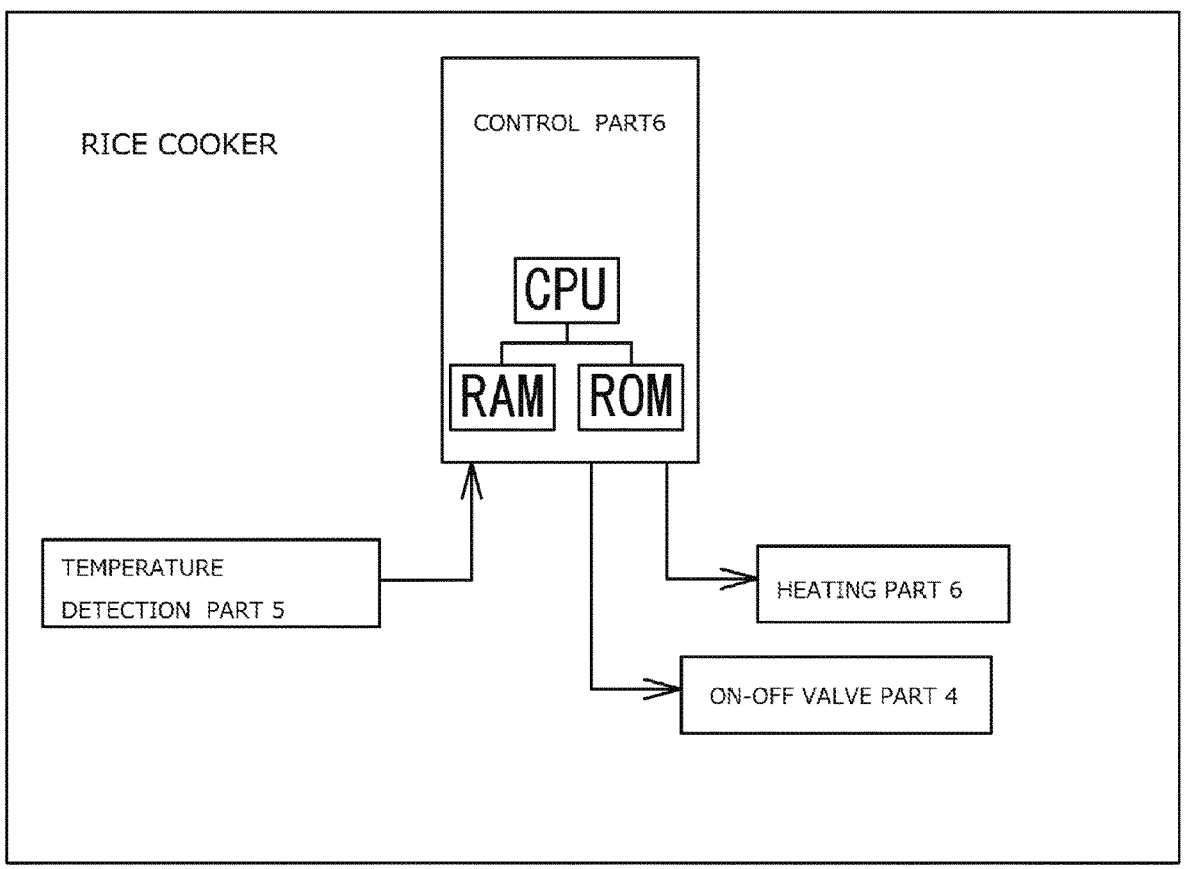
FIG. 2 is a block diagram of the rice cooker according to the example.

Then, as shown in FIG. 2, based on a temperature detected by the temperature detection part 4, the control part 6 electrically controls the heating part 3 and the on-off valve part 4. It should be noted that control means according to the present invention is constituted of the control part 6.

Also, an input panel (not shown) provided on a surface of the rice cooker 1 is connected to the control part 6 and set to enable a user to utilize various functions of the rice cooker 1 by operating the input panel.

In the following, one example of a rice cooking process using the rice cooker 1 is described.

First, predetermined amounts of brown rice and adzuki beans, which have been well washed, are put into the inner pan part 2, and predetermined amounts of water and salt are added. For example, 4 go (about 180 ml, before washing) of brown rice is used, about 28 g of adzuki beans, about 4 g of salt, and about 920 ml of water are used. It should be noted that, in the rice cooker 1, a scale that indicates the amount of water corresponding to the amount of brown rice used may be provided in the inner pan part 2, and water may be added based on the scale.

Next, after the ingredients are put into the inner pan part 2, the input panel is used to instruct the control part 6 to execute a rice cooking procedure for enzyme brown rice sequentially. When receiving a command signal corresponding to the instruction, the control part 6 sequentially controls the heating part 3 and the on-off valve part 4 such that the conditions described below are satisfied.

(Steeping Process A)

First, in a region A shown in FIG. 3, a steeping process A of maintaining the temperature of the bottom part of the inner pan part 2 detected by the temperature detection part 5 within a range of 60±10° C. is executed. By setting the temperature of the bottom part of the inner pan part 2 within such a range in this way, it is possible to allow both the brown rice and adzuki beans to absorb sufficient moisture and to promote saccharification of both the brown rice and adzuki beans. It should be noted that the time spent on the steeping process A in this example is about 20 minutes.

Here, when the temperature in the steeping process A is lower than 50° C., for example, it takes a longer time to allow the brown rice and adzuki beans to absorb sufficient moisture. Alternatively, the enzyme brown rice during rice cooking will remain hard unless the time of a steaming process after the rice cooking is extended.

Also, when the temperature in the steeping process A is higher than 70° C., saccharification of the brown rice and adzuki beans does not proceed sufficiently or the taste is deteriorated, or the adzuki beans will lose color and have poor appearance because of polyphenol removal.

(First Heating Process B)

Next, in a region B shown in FIG. 3, a first heating process B of maintaining the temperature of the bottom part of the inner pan part 2 detected by the temperature detection part 5 within a range of 120±10° C. with a pressure in the inner pan part 2 kept at 1.8 atmospheres to 2.2 atmospheres is executed. By setting the pressure in the inner pan part 2 and the temperature of the bottom part of the inner pan part 2 within such ranges, it is possible to soften both the brown rice and adzuki beans. It should be noted that the temperature around 120° C. can be achieved by keeping the pressure in the inner pan part 2 at around 2 atmospheres to raise the boiling point of water as described above, and an effect similar to that of a pressure cooker, for example, is obtained. For example, the time spent on the first heating process B is about 30 minutes.

Here, when the pressure in the inner pan part 2 is lower than 1.8 atmospheres, for example, the water boils before it reaches a temperature around 120° C. Then, it is difficult to soften the brown rice and adzuki beans.

Also, when the pressure in the inner pan part 2 is higher than 2.2 atmospheres, the brown rice and adzuki beans are excessively softened. Then, the adzuki beans will be broken or the resulting cooked enzyme brown rice will have poor texture.

Furthermore, when the temperature of the bottom part of the inner pan part 2 is lower than 110° C., it is difficult to soften the brown rice and adzuki beans.

Furthermore, when the temperature of the bottom part of the inner pan part 2 is higher than 130° C., the adzuki beans will be broken and have poor appearance and texture. In addition, the sweetness of the adzuki beans will be reduced. Also, a temperature exceeding 130° C. is maintained, the enzyme brown rice may get burned.

(Second Heating Process C)

After the first heating process B, in a region C shown in FIG. 3, a second heating process of setting the temperature of the bottom part of the inner pan part 2 detected by the temperature detection part 5 within a range of 135±20° C., which is higher than that in the first heating process B, with a pressure in the inner pan part 2 kept at 1.8 atmospheres to 2.2 atmospheres is executed. By setting the pressure in the inner pan part 2 and the temperature of bottom part of the inner pan part 2 within such ranges, the brown rice and adzuki beans, which have been softened in the first heating process B, can be cooked within a short period of time. It should be noted that if the above temperature is maintained for a predetermined period of time in the second heating process C, the enzyme brown rice may get burned because of insufficient moisture.

Also here, when the temperature of the bottom part of the inner pan part 2 in the second heating process C is lower than 115° C., for example, it takes a longer time to cook the brown rice and adzuki beans, and the time necessary for rice cooking is increased as a whole. In addition, even if a longer time is spent, the brown rice and adzuki beans cannot be fully softened and will have bad taste.

Also, when the temperature of the bottom part of the inner pan part 2 is higher than 155° C., the content will get burned and aging of the enzyme brown rice is inhibited.

(Steaming Process D)

After the second heating process C, in a region D shown in FIG. 3, a steaming process D of closing the on-off valve part 4 for 30 minutes and then opening the on-off valve part 4 for 3 minutes is executed. The enzyme brown rice that has undergone the steeping process A, the first heating process B, and the second heating process C as described above requires as short a period of time as about 30 minutes to complete the steaming process D. It should be noted that in the steaming process D, the heating part 3 is controlled such that it does not reach a temperature lower than a temperature range of 74±2° C., which is a set temperature in a first keep-warm process, which is described later. It should be noted that a rice-cooking control content according to the present invention is constituted of the steeping process A, the first heating process B, the second heating process C and the steaming process D.

It should be noted that when the steaming process D is extremely short (10 minutes, for example), the brown rice and adzuki beans will remain hard in their cores, and have poor texture and digestibility. Also, a Maillard reaction does not proceed sufficiently, and the nutritional value of the enzyme brown rice cannot be fully exhibited.

It should be noted that the enzyme brown rice that has undergone the steaming process D is already edible even at that time, it is possible to make it more nutritious, softer and easier to digest and absorb, and more tasty by keeping it warm at a predetermined temperature to induce aging by a Maillard reaction based on the starch contained in the brown rice and adzuki beans.

(First Keep-Warm Process E)

In this example, after the steaming process D is completed, in a region E shown in FIG. 3, a first keep-warm process E of maintaining the temperature of the bottom part of the inner pan part 2 detected by the temperature detection part 5 within a range of 74±2° C. is executed. Here, the temperature of 74±2° C. is higher than a keep-warm temperature set in conventional rice cookers, but it is possible to allow aging by a Maillard reaction based on the starch contained in the brown rice and adzuki beans to proceed in an early stage by setting the temperature of the bottom part of the inner pan part 2 within such a range. It should be noted that the time spent on the first keep-warm process E is about 24 hours, for example.

(Second Keep-Warm Process F)

After 24 hours have passed in the first keep-warm process E, in a region F shown in FIG. 3, a second keep-warm process F of maintaining the temperature of the bottom part of the inner pan part 2 detected by the temperature detection part 5 within a range of 72±2° C., which is lower than that in the first keep-warm process E, is executed. It should be noted that a keep-warm control content according to the present invention is constituted of the first keep-warm process E and the second keep-warm process F.

In the first keep-warm process E, the enzyme brown rice tends to be dried because it is kept warm at a temperature of 74±2° C., which is higher than a conventional temperature. Thus, by lowering the temperature at which the enzyme brown rice is kept warm to 72±2° C. after the lapse of 24 hours, it is possible to prevent the enzyme brown rice from being excessively dried. By properly managing the temperature in each of the keep-warm processes E and F in this way, it is possible to make the enzyme brown rice tasty even if it is eaten at any time while promoting its aging.

More specifically, because softening of the brown rice and adzuki beans has been promoted since they have undergone the steeping process A, in particular, as described above, it is possible to cook enzyme brown rice that is easy to digest and absorb and is tasty and flavorous. Also, because softening of the brown rice and adzuki beans is promoted, the Maillard reaction during the keep-warm period (at least the first keep-warm process E) proceeds as actively as in a conventional case. Thus, even when the steaming process D is as short as about 30 minutes, melanoidin is produced sufficiently to enhance the nutritional value of the enzyme brown rice. It should be noted that when kept warm at a temperature of 69° C. or lower, for example, in the above keep-warm processes E and F, the enzyme brown rice may tend to be putrescible.

Also, the control part 6 executes the first keep-warm process E and the second keep-warm process F as described above, and also executes an on-off valve part control content for repeating a step of bringing the on-off valve part 4 into an open state and a step of bringing the on-off valve part 4 into a closed state. The on-off valve part control content is described below in detail.

(From Immediately after Rice Cooking to One Hour)

For one hour after the completion of the steaming process D, in a region G shown in FIG. 4, the on-off valve part 4 maintains an open state. It should be noted that the enzyme brown rice that has undergone the steaming process D contains sufficient moisture, and excess moisture causes the surface of the brown rice and adzuki beans to be sticky and have poor texture when the inside of the inner pan part 2 is kept closed. Thus, by bringing the on-off valve part 4 into an open state, it is possible to release excess moisture to the outside to prevent the enzyme brown rice from getting sticky.

(From One Hour to 12 Hours)

After the lapse of one hour from the completion of the steaming process D, in a region H shown in FIG. 4, a step of maintaining the on-off valve part 4 in an open state for 5 minutes and then maintaining the on-off valve part 4 in a closed state for 5 minutes is repeated until another 12 hours passes from that point of time.

(From 12 Hours to 48 Hours)

After the lapse of 12 hours, in a region I shown in FIG. 4, a step of maintaining the on-off valve part 4 in an open state for 5 minutes and then maintaining the on-off valve part 4 in a closed state for 10 minutes is repeated until another 48 hours passes from that point of time.

(After 48 Hours)

After the lapse of 48 hours, in a region J shown in FIG. 4, a step of maintaining the on-off valve part 4 in an open state for 5 minutes and then maintaining the on-off valve part 4 in a closed state for 15 minutes is repeated.

In other words, the control content is characterized by a configuration in which, in the keep-warm processes after the completion of rice cooking, the period for which the on-off valve part 4 is maintained in a closed state is increased compared to that of a previously closed state with the lapse of time. This is because moisture is generated with the progress of aging of the enzyme brown rice but there is a possibility that the enzyme brown rice is excessively dried and aging of the enzyme brown rice is inhibited if the on-off valve part 4 is simply maintained in an open state. Also, when the enzyme brown rice is dried, it may have poor texture and digestion and absorption of nutrients may be inhibited. Thus, in order to provide enzyme brown rice that does not deteriorate in texture and that remains soft to allow sufficient digestion and absorption of nutrients, an idea of increasing the time of closed state with the lapse of time while securing the time of open state was reached. As a result, it is possible to provide enzyme brown rice that tastes good at any time without causing the enzyme brown rice to be dried excessively and, conversely, without causing the enzyme brown rice to get unnecessarily sticky.

It should be noted that the time spent on aging of enzyme brown rice is about 7 days (168 hours) at the maximum and it is preferred to eat it within this period. When enzyme brown rice is kept warm for more than 7 days, it does not get rotten but loses moisture and becomes hard and difficult to eat.

In the example described above, modifications can be made as appropriate unless they deviate the gist of the present invention. For example, the rice cooker 1 may have procedures for cooking white rice or brown rice, in addition to that for enzyme brown rice, stored in the ROM of the control part 6 or the like, or may be configured to execute a rice-cooking procedure at a desired time with a timer or the like. Also, the size and shape of the inner pan part 2 can be freely selected as appropriate. Also, for example, in the on-off valve part control content, the on-off valve part 4 may be constantly set in a closed state after the keep-warm state is continued for 48 hours or more. Also, in view of the production cost, the on-off valve part 4 may be composed of a structure including an electrically-controlled on-off valve and a known weight-loaded pressure regulating valve that closes an opening only by its own weight.

DESCRIPTION OF REFERENCE NUMERALS 1 rice cooker
2 inner pan part
3 heating part
4 on-off valve part
5 temperature detection part
6 control part (control means)

The invention claimed is:

1. A rice cooker, comprising:
an inner pan part for containing enzyme brown rice including at least brown rice, adzuki beans, water, and salt as a content;
a heating part for heating the inner pan part;
a temperature detection part for detecting a temperature of a bottom part of the inner pan part;
an on-off valve part for providing communication or non-communication between inside and outside of the inner pan part; and
control means for controlling the heating part and the on-off valve part based on a temperature detected by the temperature detection part,
wherein the control means includes rice-cooking control instructions for the content including at least the brown rice, the adzuki beans, the water, and the salt, wherein based on the rice-cooking control instructions, the control means executes:
a steeping process, executed after a step of receiving a command signal that sequentially executes a rice-cooking procedure to continue to warm the inner pan part at ambient temperature, of maintaining the temperature detected by the temperature detection part within 50° C. to 70° C. inclusive to steep the content;
a first heating process, executed after the steeping process, of maintaining the temperature detected by the temperature detection part within 110° C. to 130°

C. inclusive with a pressure in the inner pan part maintained within 1.8 atmospheres to 2.2 atmospheres inclusive;

a second heating process, executed after the first heating process, of setting the temperature detected by the temperature detection part within 115° C. to 155° C. inclusive, which is further higher than that in the first heating process, with a pressure in the inner pan part maintained within 1.8 atmospheres to 2.2 atmosphere inclusive; and a steaming process, executed after the second heating process, of steaming the content for a predetermined period of time, and wherein the control means further includes keep-warm control instructions, and based on the keep-warm control instructions, the control means execute:

a first keep-warm process, executed after the completion of the steaming process of the rice-cooking control content, of maintaining the temperature detected by the temperature detection part within 72° C. to 76° C. inclusive; and a second keep-warm process, executed after the first keep-warm process, of maintaining the temperature detected by the temperature detection part within 70° C. to 74° C. inclusive, which is further lower than that in the first keep-warm process.

2. The rice cooker according to claim 1, wherein the control means is configured to execute the keep-warm control content and to include an on-off valve part control content for repeating a step of bringing the on-off valve part into an open state or closed state, and wherein the on-off valve part control content includes a step of increasing the time of closed state compared to that of a previously closed state with the lapse of time.

\* \* \* \* \*